(12) United States Patent
Ho (10) Patent No.: US 7,933,401 B2
(45) Date of Patent: Apr. 26, 2011

(54) KEY ASSEMBLY

(75) Inventor: Chin-Hsin Ho, Taipei (TW)

(73) Assignee: Altek Corporation, Hsinchu (TW)

( * ) Notice: Subject to any disclaimer, the term of this patent is extended or adjusted under 35 U.S.C. 154(b) by 1171 days.

(21) Appl. No.: 11/462,004

(22) Filed: Aug. 2, 2006

(65) Prior Publication Data

US 2007/0280658 A1 Dec. 6, 2007

(30) Foreign Application Priority Data

Jun. 2, 2006 (TW) .............................. 95119711 A (51) Int. Cl.
*H04M 1/00* (2006.01)
*H04M 9/00* (2006.01)
*G06F 3/02* (2006.01)
*G09G 5/00* (2006.01)

(52) U.S. Cl. ................... 379/429; 379/428.01; 345/170; 345/172

(58) Field of Classification Search ............. 379/201.06, 379/429, 428.01; 715/857; 345/169, 170, 345/172; 361/680
See application file for complete search history.

(56) References Cited

U.S. PATENT DOCUMENTS

| 7,671,845 B2 * | 3/2010 | Keely ............................. 345/169 |
| 2003/0223185 A1 * | 12/2003 | Doczy et al. .................. 361/680 |
| 2006/0123362 A1 * | 6/2006 | Keely ............................ 715/857 |

FOREIGN PATENT DOCUMENTS

TW M246788 10/2004
* cited by examiner

*Primary Examiner* — Thjuan K Addy
(74) *Attorney, Agent, or Firm* — Workman Nydegger (57) ABSTRACT

A key assembly applicable in an electronic device for performing preset functions is provided. The key assembly includes a control member and at least one sensor, wherein the control member selectively enables any sensor to sense the external operation, and when an external operation is sensed, the sensor outputs a triggering signal for performing the corresponding function.

20 Claims, 10 Drawing Sheets

KEY ASSEMBLY

CROSS-REFERENCE TO RELATED APPLICATIONS

This non-provisional application claims priority under 35 U.S.C. §119(a) on Patent Application No(s). 095119711 filed in Taiwan, R.O.C. on Jun. 2, 2006, the entire contents of which are hereby incorporated by reference.

BACKGROUND OF THE INVENTION

1. Field of Invention

The present invention relates to a key assembly, and more particularly, a key assembly using sensors to sense the external state changes, so as to make the electronic device perform a preset function.

2. Related Art

The common electronic devices used in daily life or controlling equipments such as processing equipments used in industry all have key-in structure for controlling the above equipments. The conventional key structure substantially comprises spring-type structure and film-type structure. In the spring-type key structure, a pin is disposed on one side of the key body with respect to an electrical switch of the electronic device, and a spring is disposed between the key body and the electrical switch. When the user presses the spring-type key, the pin of the key body triggers the electrical switch by the elastic force of the spring, such that the electronic device performs the preset function corresponding to the electrical switch, and due to the elastic recovery characteristic of the spring, the key returns to its original position after being released. The film-type key structure is made of rubber, and the film-type key structure is disposed in the pre-designed key area of the electronic device. When the film-type key is pressed, the protrusion under the key structure is in electrically contact with the electrical switch corresponding to the key area, such that the electronic device performs the preset function corresponding to the electrical switch, and the film-type key returns to its original state due to the elastic characteristic of the rubber itself.

No matter the spring-type key structure using the spring for elastic recovery or the film-type key structure made of rubber, after being used for a long time, the elastic fatigue of the material occurs, thus influencing the sensitivity of the key structure, such that the key structure cannot certainty electrically contact with the electrical switch thoroughly. In order to accommodate the key body, spring, and electrical switch of the spring-type key structure in the conventional art, and due to the travel distance required when the spring-type structure is operated, the designed space of the electronic device is excessively large, thus the volume cannot be reduced, which cannot meet the requirements for the current electronic device of being light and thin.

In addition, in Utility Model NO. M246788 "Thermal Character and Symbol Inputting Apparatus and Key-in Unit thereof" issued in ROC Patent Gazette on Oct. 11, 2004, a plurality of thermal sensors is disposed on each key operating area on the surface of the keyboard substrate. When the user presses the key operating area, the corresponding thermal sensor senses a temperature variable signal, and after the signal has been processed, a key signal corresponding to the position of the thermal sensor is sent out.

The Utility Model NO. M246788 can significantly reduce the space and travel distance required by the spring-type key structure in the conventional art, however, the used thermal sensors requires an excessively long time for sensing the temperature, and the size of the contact area between the user and the operating area also influences the sensitivity of the thermal sensor. In addition, when the thermal sensor is used under different climates or in the environment having extremely large temperature difference such as tropical countries or frigid countries, the practical climate must be considered to adjust the thermal sensors. If the user carries along the electronic device having the thermal sensor to travel all over the world, different temperatures and climates possibly cause the accuracy reduction of the thermal sensor.

Also, in the thermal key-in unit disclosed in the Utility Model NO. M246788, the user touches the operating area such that the thermal sensor senses the temperature change of the operating area. However, there is no mechanism or means for limiting and protecting the thermal sensor being disposed in the operating area, the user may touch the operating area of the unnecessary key by mistake and an operation error occurs accordingly, thus causing trouble and inconvenience when the user uses the thermal key-in unit.

The spatial travel distance occupied by the spring-type key structure in the conventional art is excessively large, thus the volume of the electronic device cannot be reduced. The thermal sensor disclosed in the Utility Model NO. M246788 cannot solve the problem of the reduction of the sensing accuracy of the thermal sensor caused by a large temperature difference of the environment, and in addition, no means for protecting and limiting the thermal sensor is disposed in the operating area, thus an operation error easily occurs for the key-in unit.

SUMMARY OF THE INVENTION

In view of the above problems, the present invention provides a key assembly, for eliminating the limitations or defects that the occupied space and the travel distance of the spring-type key structure in the prior art are excessively large, and that the accuracy of the thermal sensor is reduced due to the temperature difference of the environment and thereby mis-operation easily occurs.

The key assembly disclosed in the present invention is applied in an electronic device comprising a plurality of electronic components. The key assembly comprises a plurality of sensors disposed on the electronic device, and a control member corresponding to the sensors. The sensor is used to sense the external changes of the electronic device, and the control member is movably disposed within the electronic device and has an opening. With the movement of the control member, the opening may selectively correspond to any sensor, and the corresponding sensor outputs a triggering signal to the electronic device according to the external state change, such that the electronic device performs the preset function corresponding to the key.

The sensor of the present invention is further disposed within the electronic device in a single form, and a metal blade spring of the control member selectively come into electrical contact with any conducting element of the electronic device, such that the sensor is electrically connected to the corresponding conducting element, and the conducting element outputs a preset signal to the electronic device, and then the sensor outputs a triggering signal to the electronic device together with the preset signal according to the external change.

The efficacy of the present invention lies in that, both the spatial travel distance and the number of components required by the key assembly are significantly reduced, thus the electronic device achieves the requirements of being light, thin, short, and small and thereby reducing the manufacturing cost. With the movement of the control member corresponding to the sensor, or as the metal blade spring of the control member is electrically contacted with the plurality of conducting elements, a preset signal is correspondingly output, the mis-operation of the electronic device caused by the key assembly being touched by mistake can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only for, which, thus, is not limitative of the present invention, and wherein.

DETAILED DESCRIPTION OF THE INVENTION

The key assembly disclosed according to the present invention is applied in an electronic device. Electronic devices include, but not limited to, personal computers (PC), notebooks, digital cameras, mobile phones, PDAs, etc. In the following detailed description of the present invention, the digital camera is taken as the most preferred embodiment of the present invention. However, the accompanying drawings are only used for making reference and illustration, but not intend to limit the present invention.

Figure 1A:
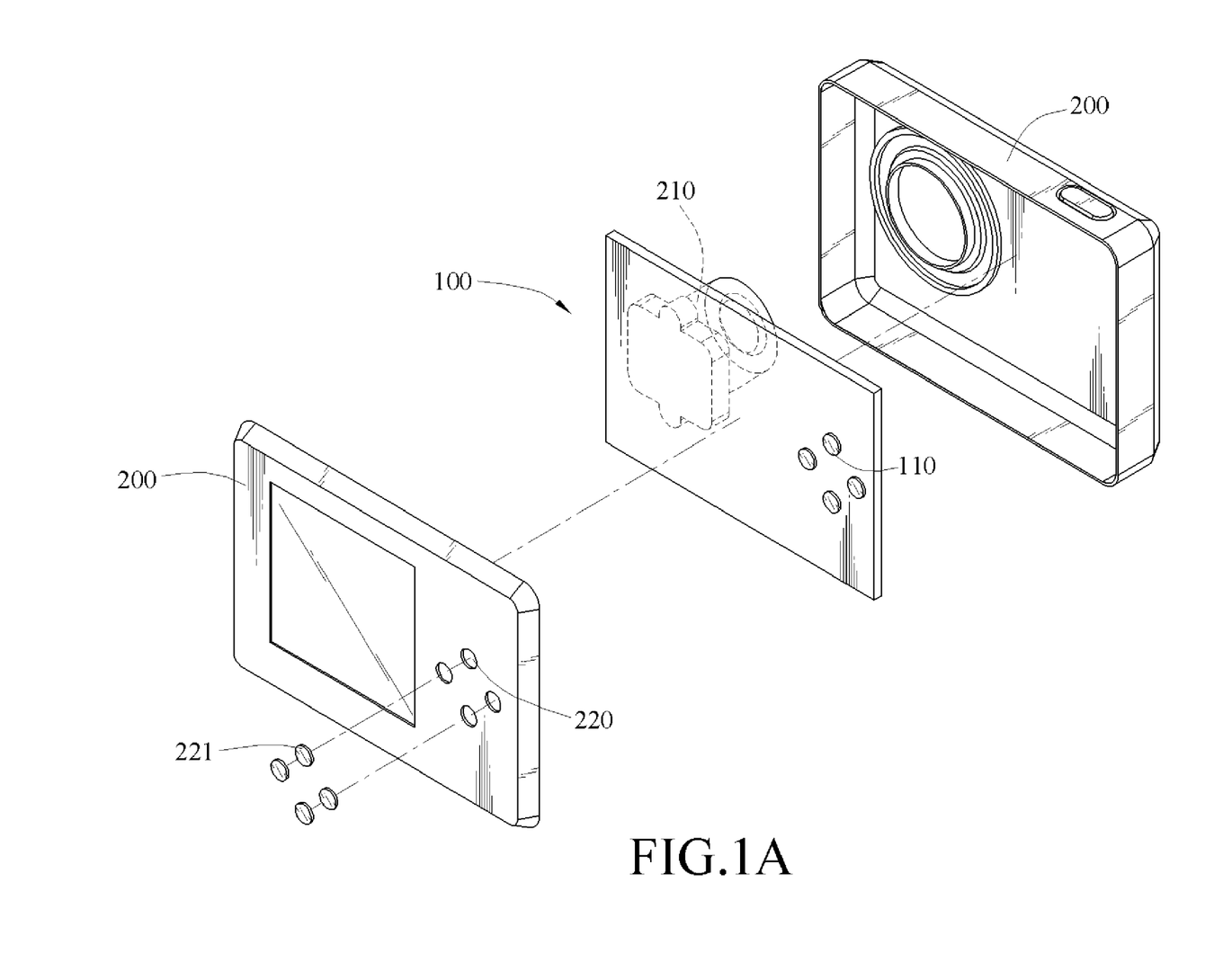
FIG. 1A is an exploded schematic view of a first embodiment of the present invention.
Figure 1B:
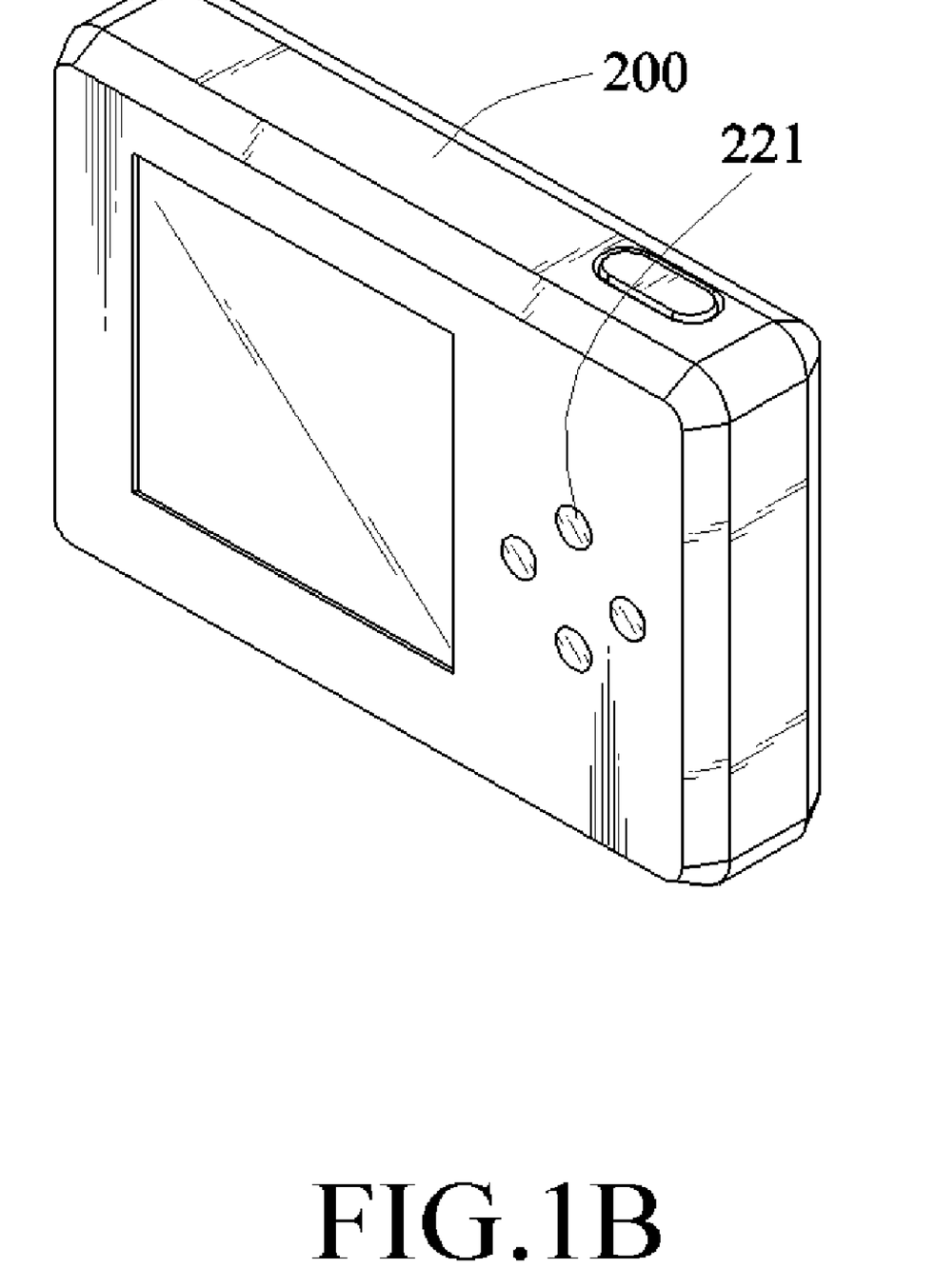
FIG. 1B is a schematic stereogram of the first embodiment of the present invention.

FIG. 1A and FIG. 1B are an exploded schematic view and a schematic stereogram of a first embodiment of the present invention respectively. The key assembly 100 disclosed in the present invention is applied in an electronic device 200 having a plurality of electronic components 210, wherein the electronic components 210 comprise circuit boards, sensing units, lenses, etc. In the first embodiment of the present invention, a plurality of sensors 110 is disposed within the electronic device 200. When the user presses the linear direction corresponding to one sensor 110, the corresponding sensor 110 outputs a triggering signal to the electronic device 200 according to the external change, so as to perform the preset function of the corresponding sensor 110.

Referring to FIG. 1A and FIG. 1B, the sensor 110 is a pyroelectric IR sensor capable of sensing the infrared ray emitted from the human body. When the pyroelectric IR sensor has sensed the infrared ray from the human body, the sensor 110 generates a signal change, so as to control the electronic device 200 to perform the preset function indicated by the sensor 110. In addition, a plurality of through holes 220 corresponding to the sensor 110 is opened on the housing of the electronic device 200, such that it is convenient for the user to press the position of the sensor 110 corresponding to the preset function to be performed. In order to prevent the sensitivity of the sensor 110 from being influenced by the external dirty dust, and prevent circuit short of the electronic components 210 caused by liquids flowing into the electronic device 200 via the through holes 220, a transparent cover 221 is engaged in the through holes 220, and the material of the transparent cover 221 can be transparent material such as acrylic material or glass, which does not reduce the sensing efficiency of the sensor 110.

Figure 2A:
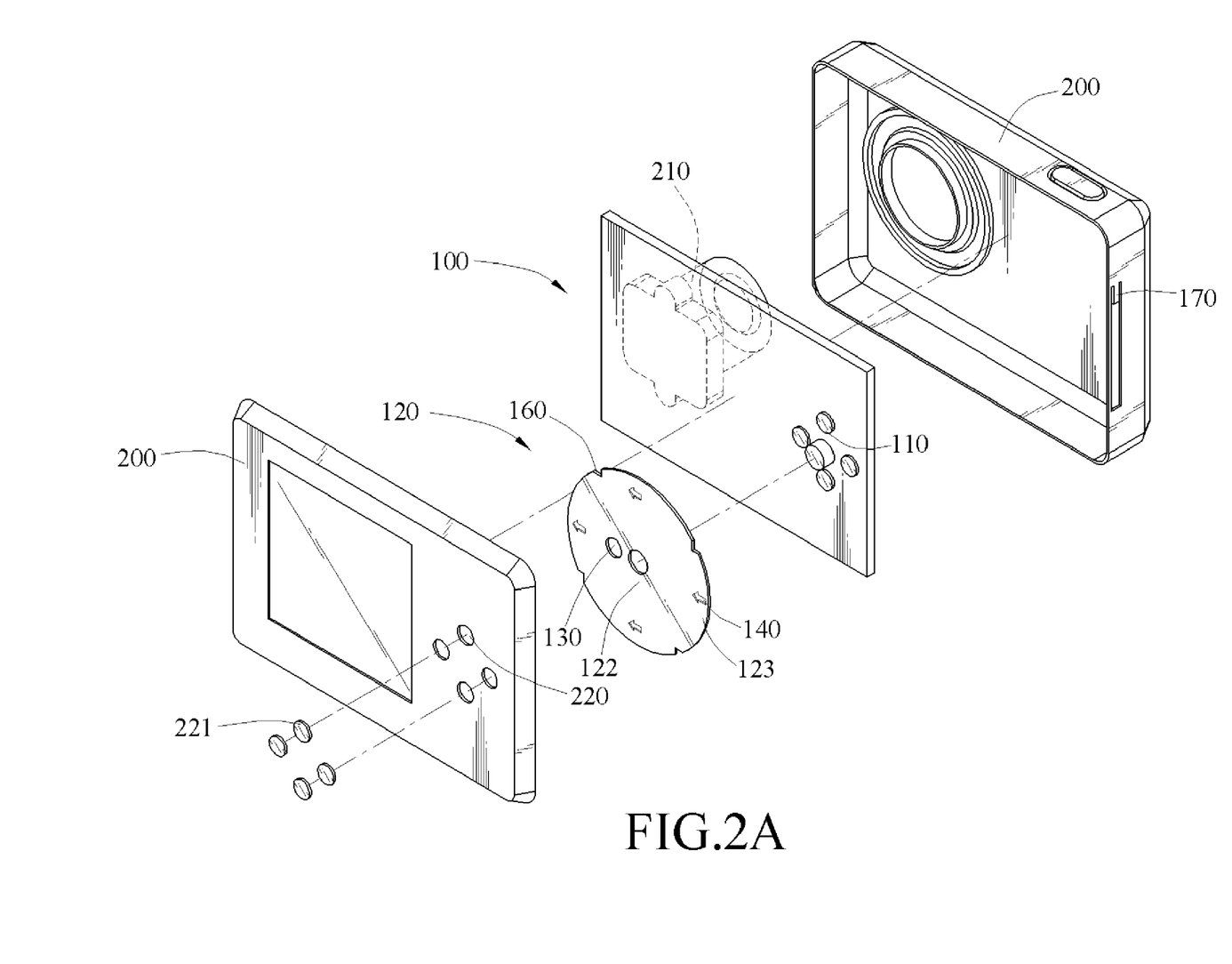
FIG. 2A is an exploded schematic view of a second embodiment of the present invention.
Figure 2B:
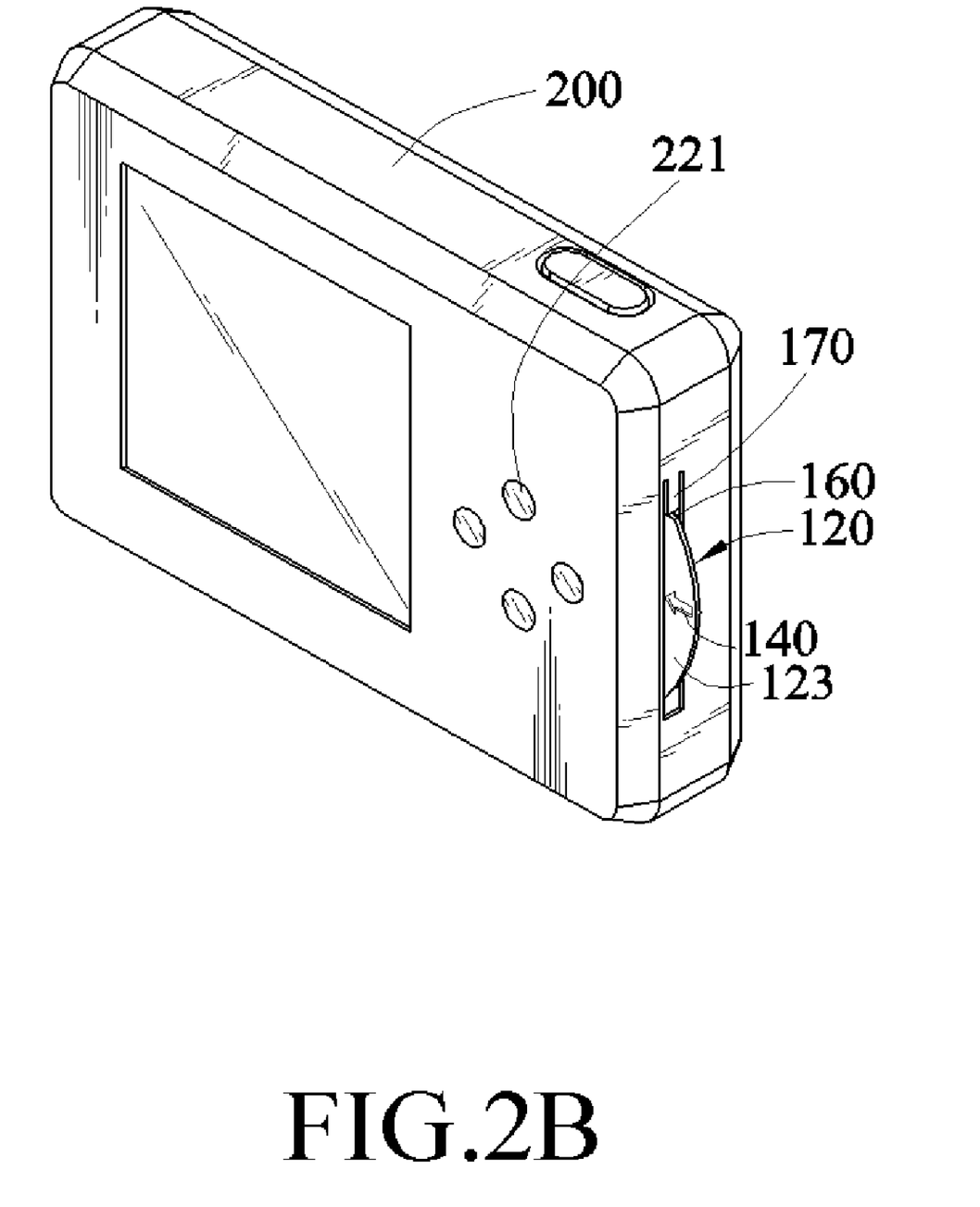
FIG. 2B is a schematic stereogram of the second embodiment of the present invention.

FIG. 2A and FIG. 2B are an exploded schematic view and a schematic stereogram of a second embodiment of the present invention respectively. The key assembly 100 disclosed in the present invention is applied in an electronic device 200 having a plurality of electronic components 210. The key assembly 100 comprises a plurality of sensors 110 disposed within the electronic device 200, and a turntable 120 corresponding to the sensors 110. The sensors 110 are used to sense the external change of the electronic device 200, and the turntable 120 is movably disposed within the electronic device 200. The turntable 120 is provided with an opening 130 with respect to the electronic device 200, and as the turntable 120 rotates freely, the opening 130 selectively corresponds to any of the sensors 110, such that the corresponding sensor 110 senses the external change only through the opening 130, thus preventing the user from pressing the sensing position of other sensors by mistake and thereby causing mis-operation. When the user presses the linear direction corresponding to the sensor 110, the corresponding sensor 110 outputs a triggering signal to the electronic device 200 according to the external change, so as to perform the preset function of the corresponding sensor 110.

Referring to FIG. 2A and FIG. 2B, the sensor 110 is a pyroelectric IR sensor. A transparent cover 221 is engaged in the through hole 220, and the material of the transparent cover 221 can be transparent material such as acrylic material or glass, which does not reduce the sensing efficiency of the sensor 110.

Please refer to FIG. 2A and FIG. 2B, the turntable 120 used for avoiding mis-operation comprises a main body 122 and an operation part 123, wherein the operation part 123 is disposed on the outer edge of the main body 122, and protrudes from one side of the electronic device 200. A plurality of identification marks 140 is printed on the operation part 123, thus, it is convenient for the user to rotate the turntable 120 and recognize the position of the sensor 110 corresponding to the current opening 130. Also, a plurality of rabbets 160 is disposed on the outer edge of the turntable 120, and a positioning element 170 is disposed on one side of the electronic device 200. Different rabbets 160 correspond to different sensors 110 in position, when the turntable 120 is rotated such that one of the rabbets 160 presses against the positioning element 170, the opening 130 is just aligned with the sensor 110 corresponding to the rabbet 160, thus, it is convenient for the user to align the opening 130, the sensor 110, and the through hole 220 in the same straight line.

Figure 3A:
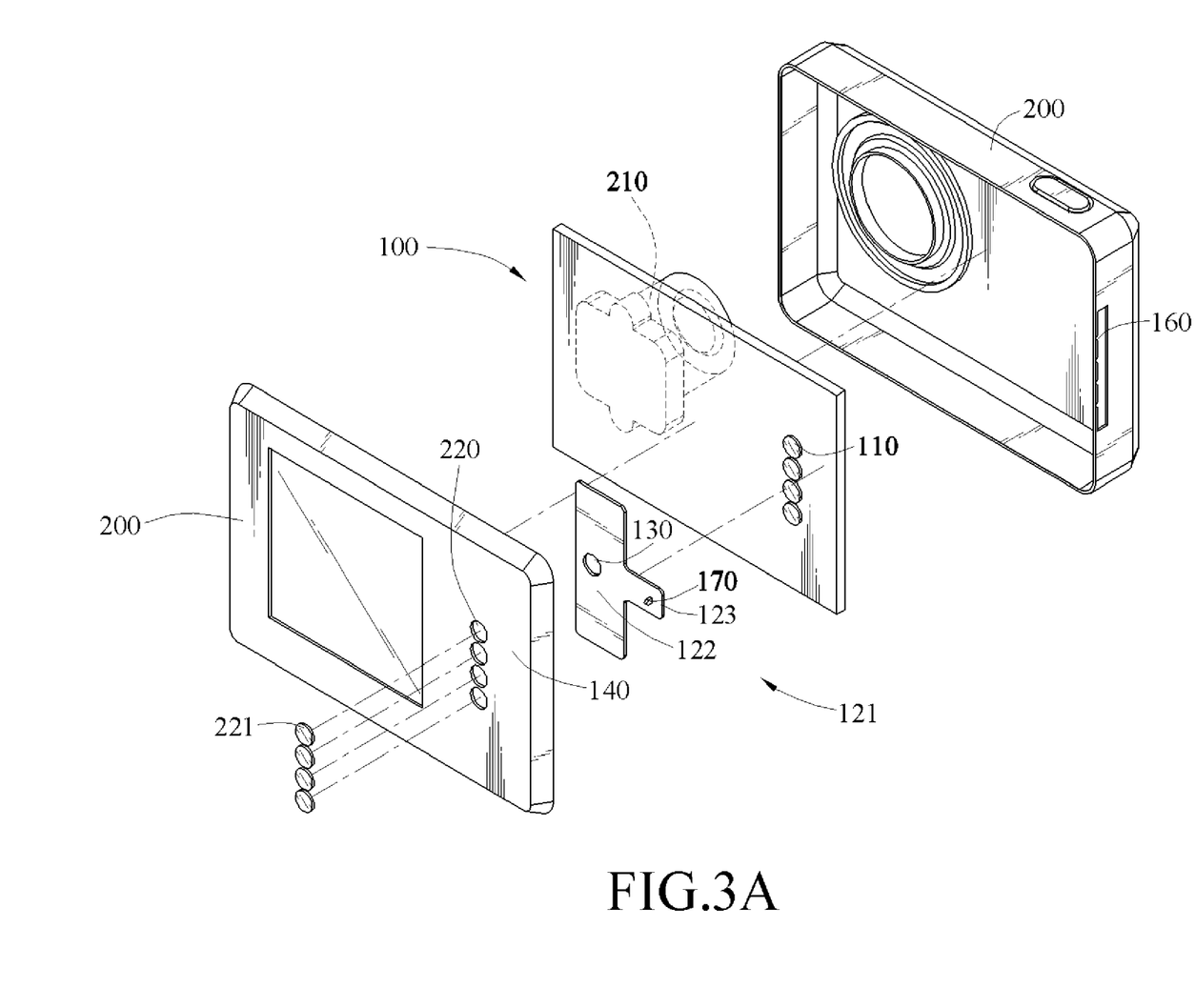
FIG. 3A is an exploded schematic view of a third embodiment of the present invention.
Figure 3B:
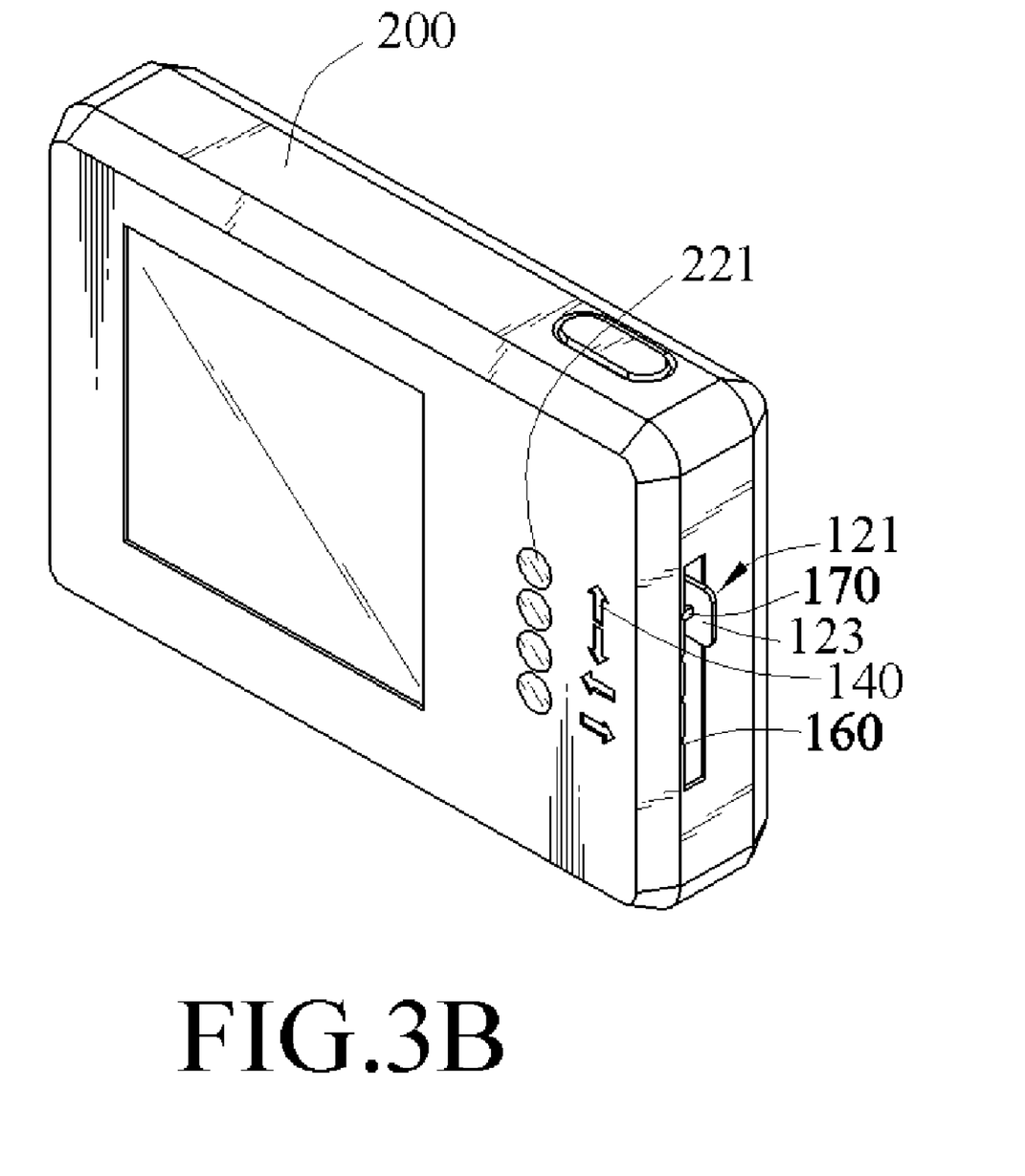
FIG. 3B is a schematic stereogram of the third embodiment of the present invention.

FIG. 3A and FIG. 3B are an exploded schematic view and a schematic stereogram of a third embodiment of the present invention respectively. The control member of the present invention further can be a plate 121, which is movably disposed within the electronic device 200. The plate 121 is disposed with an opening 130 with respect to the electronic device 200, and as the plate 121 moves linearly, the opening 130 selectively corresponds to any one of the sensors 110, such that the corresponding sensor 110 senses the external change only through the opening 130, thus preventing the mis-operation of the electronic device 100. When the user presses to the linear direction corresponding to the sensor 110, the corresponding sensor 110 outputs a triggering signal to the electronic device 200 according to the external change, so as to perform the preset function of the corresponding sensor 110. The sensor 110 is a pyroelectric IR sensor. A transparent cover 221 is embedded in the through hole 220, and the material of the transparent cover 221 can be transparent material such as acrylic material or glass, which does not reduce the sensing efficiency of the sensor 110.

Referring to FIG. 3A and FIG. 3B, the plate 121 used for preventing mis-operation comprises a main body 122 and an operation part 123 disposed on the outer edge of the main body 122. A plurality of identification marks 140 is printed on the housing of the electronic device 200 corresponding to the operation part 123, such that it is convenient for the user to identify the position of the sensor 110 corresponding to the opening 130 on the plate 121. Also, a positioning element 170 is disposed on the operation part 123 of the plate 121, and a plurality of rabbets 160 corresponding to the sensors 110 is disposed on one side of the electronic device 200. When the positioning element 170 of the plate 121 is moved to one of the rabbets 160, the opening 130 is just aligned with the sensor 110 corresponding to the rabbet 160, thus, it is convenient for the user to align the opening 130, the sensor 110, and the through hole 220 in the same straight line.

Figure 4A:
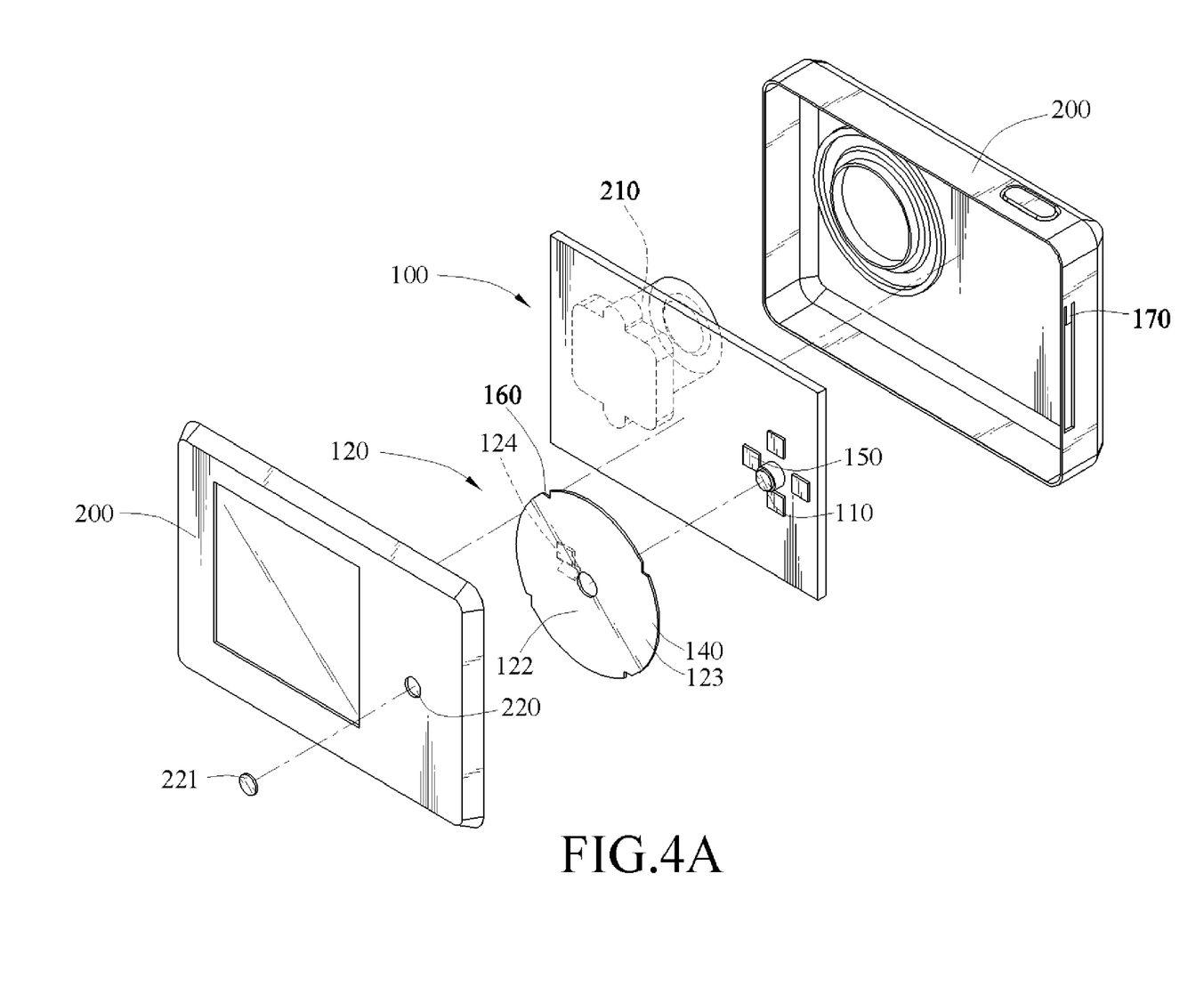
FIG. 4A is an exploded schematic view of a fourth embodiment of the present invention.
Figure 4B:
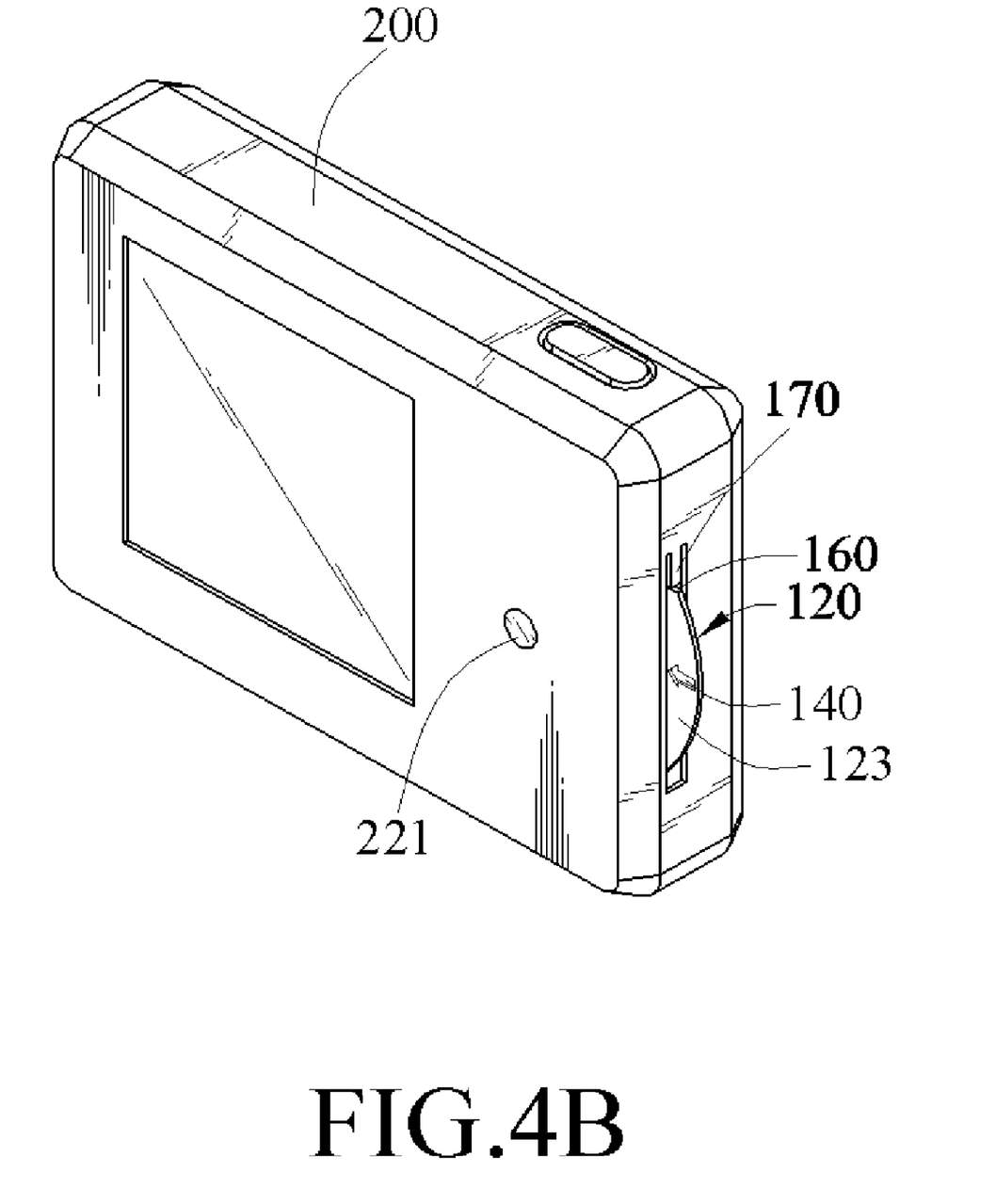
FIG. 4B is a schematic stereogram of the fourth embodiment of the present invention.

FIG. 4A and FIG. 4B are an exploded schematic view and a schematic stereogram of a fourth embodiment of the present invention respectively. The key assembly 100 disclosed in the present invention is applied in an electronic device 200 having a plurality of electronic components 210, wherein the electronic components 210 comprise circuit boards, sensing units, lenses, etc. The key assembly 100 comprises a sensor 110 disposed within the electronic device 200, a plurality of conducting elements 150 disposed within the electronic device 200, and a turntable 120 corresponding to the sensor 110. The sensor 110 is used to sense the external change of the electronic device 200, and the turntable 120 is movably disposed within the electronic device 200. The turntable 120 has a metal blade spring 124 on one side of the turntable 120 opposite to the conducting element 150 and an opening 130 corresponding to the sensor 110. As the turntable 120 rotates freely, the metal blade spring 124 selectively corresponds to any one of the conducting elements 150, such that the sensor 110 is electrically connected to the corresponding conducting element 150, and the corresponding conducting element 150 outputs a preset signal. When the user presses to the linear direction corresponding to the sensor 110, together with the preset signal of the conducting element 150, the sensor 110 outputs a triggering signal to the electronic device 200 according to the external change, so as to perform the preset function of the sensor 110. The sensor 110 is a pyroelectric IR sensor. A transparent cover 221 is embedded in the through hole 220, and the material of the transparent cover 221 can be transparent material such as acrylic material or glass, which does not reduce the sensing efficiency of the sensor 110.

Referring to FIG. 4A and FIG. 4B, the turntable 120 comprises a main body 122 and an operation part 123 disposed on the outer edge of the main body 122, and the operation part 123 protrudes from one side of the electronic device 200 to facilitate the user to rotate the turntable 120. A plurality of identification marks 140 is printed on the operation part 123, thus, it is convenient for the user to recognize the position of one conducting element 150 that is electrically connected to the metal blade spring, so as to determine the preset signal output by the current conducting element. Also, a plurality of rabbets 160 is disposed on the operation part 123 of the turntable 120, and a positioning element 170 is disposed on one side of the electronic device 200. When one of the rabbets 160 presses against the positioning element 170 due to the rotation of the turntable 120, the metal blade spring 124 is just electrically contacted with the conducting element 150, thus, it is convenient for the user to electrically connect the metal blade spring 124 to the corresponding conducting element 150.

Figure 5A:
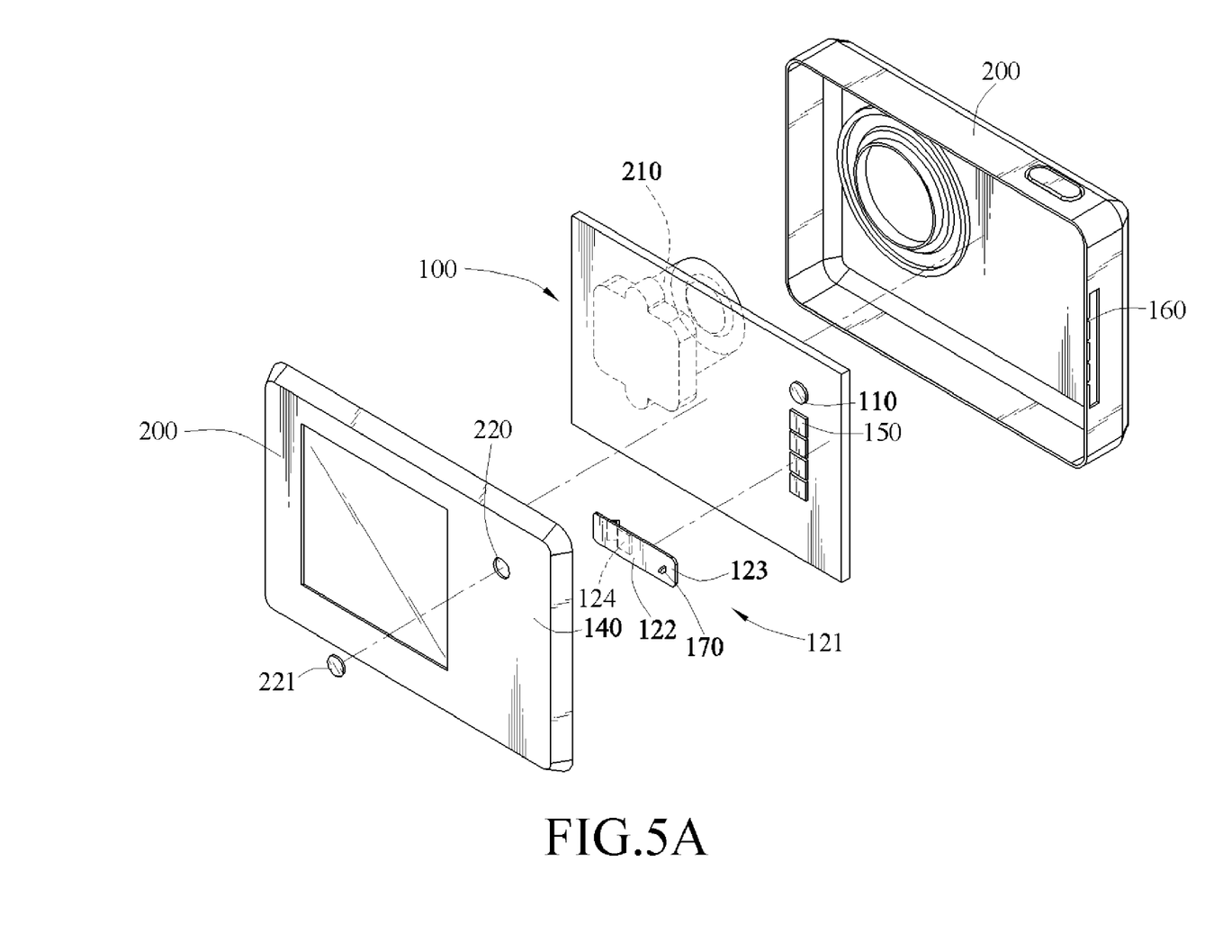
FIG. 5A is an exploded schematic view of a fifth embodiment of the present invention.
Figure 5B:
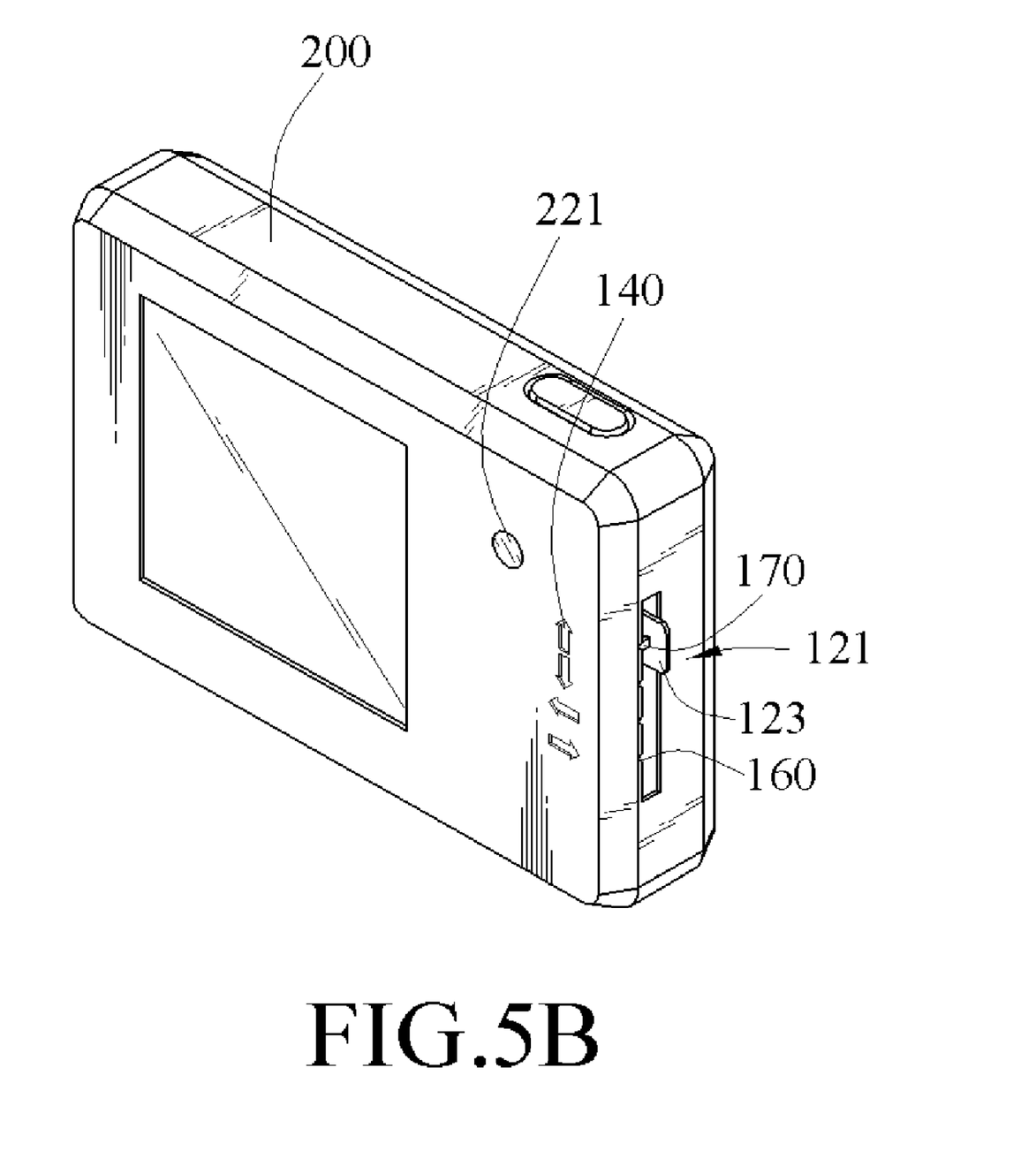
FIG. 5B is a schematic stereogram of the fifth embodiment of the present invention.

FIG. 5A and FIG. 5B are an exploded schematic view and a schematic stereogram of a fifth embodiment of the present invention respectively. The key assembly 100 disclosed in the present invention is applied in an electronic device 200 having a plurality of electronic components 210, and the electronic components 210 comprise circuit boards, sensing units, lenses, etc. The key assembly 100 comprises a sensor 110 disposed within the electronic device 200, a plurality of conducting elements 150 disposed within the electronic device 200, and a plate 121 corresponding to the sensor 110. The sensor 110 is used to sense the external change of the electronic device 200, and the plate 121 is movably disposed within the electronic device 200. The plate 121 has a metal blade spring 124 disposed on one side of the plate 121 opposite to the conducting element 150, and as the turntable 120 rotates freely, the metal blade spring 124 selectively corresponds to any one of the conducting elements 150, such that the sensor 110 is electrically connected to the corresponding conducting element 150, and the corresponding conducting element 150 outputs a preset signal. When the user presses to the linear direction corresponding to the sensor 110, together with the preset signal of the conducting element 150, the sensor 110 outputs a triggering signal to the electronic device 200 according to the external change, so as to perform the preset function of the sensor 110. The sensor 110 is a pyroelectric IR sensor. A transparent cover 221 is embedded in the through hole 220, and the material of the transparent cover 221 can be transparent material such as acrylic material or glass, which does not reduce the sensing efficiency of the sensor 110.

Referring to FIG. 5A and FIG. 5B, the plate 121 comprises a main body 122 and an operation part 123 disposed on the outer edge of the main body 122. A plurality of identification marks 140 is printed on the housing of the electronic device 200 corresponding to the operation part 123, thus, it is convenient for the user to recognize the position of the sensor 110 corresponding to the opening 130 of the plate 121. Also, a positioning element 170 is disposed on the operation part 123 of the plate 121, and a plurality of rabbets 160 corresponding to the position of the sensor 110 is disposed on one side of the electronic device 200. When the positioning element 170 of the plate 121 is moved to one of the rabbets 160, the metal blade spring 124 is just electrically contacted with the conducting element 150, thus, it is convenient for the user to electrically connect the metal blade spring 124 to the corresponding conducting element 150.

It should be noted that, the preset function indicated by the sensor 110 according to the present invention is the function of controlling the direction, and the corresponding identification marks 140 are direction indications. Those skilled in the art can also change the preset function indicated by the sensor 110 to selection function, shortcut function, and the like, which is not limited in the embodiments disclosed in the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A key assembly applicable in an electronic device, wherein the electronic device comprises a plurality of electronic components for performing a preset function, the key assembly comprising:
    a plurality of light sensors, disposed within the electronic device, for sensing an external light change; and
    a control member, disposed within the electronic device, rotatable with respect to the electronic device, corresponding to said plurality of light sensors, the control member having an opening, wherein as said control member rotates, the opening moves together with the control member relative to the light sensors and exposes one of the light sensors while the rest of the light sensors are covered with the control member, such that said corresponding light sensor senses the external light change via the opening and outputs a triggering signal according to the external change.

2. The key assembly as claimed in claim 1, wherein said sensor is a pyroelectric IR sensor.

3. The key assembly as claimed in claim 1, wherein the electronic device further comprises a plurality of through holes corresponding to said sensor.

4. The key assembly as claimed in claim 3, wherein the plurality of through holes is embedded with a transparent cover.

5. The key assembly as claimed in claim 1, wherein said control member comprises a main body with an operation part being disposed on the outer edge of the main body and protruding from one side of the electronic device.

6. The key assembly as claimed in claim 1, wherein said control member is a movable turntable.

7. The key assembly as claimed in claim 6, wherein the operation part of the turntable has a plurality of identification marks.

8. The key assembly as claimed in claim 1, wherein said control member is a linearly movable plate.

9. The key assembly as claimed in claim 8, wherein the electronic device has a plurality of identification marks on one side opposite to the plate.

10. A key assembly applicable in an electronic device, wherein the electronic device comprises a plurality of electronic components for performing a preset function, the key assembly comprising:
    a light sensor, disposed within the electronic device, for sensing an external change;
    a plurality of conducting elements, disposed within the electronic device, for triggering a signal to the electronic device; and
    a turntable, disposed within the electronic device, rotatable with respect to the electronic device and having a metal blade spring on one side of the turntable opposite to said conducting element, the turntable having an opening exposing said light sensor, wherein said light sensor senses the external light change via the opening, and as said turntable rotates, the metal blade spring is moved together with the turntable relative to the conducting elements so as to physically and electrically contact with one of said conducting elements selectively and physically and electrically disconnect with the rest of the conducting elements, such that said light sensor is electrically connected to said corresponding conducting element; said corresponding conducting element outputs a preset signal; and together with the preset signal, said light sensor outputs a triggering signal according to the external change.

11. The key assembly as claimed in claim 10, wherein said sensor is a pyroelectric IR sensor.

12. The key assembly as claimed in claim 10, wherein the electronic device further comprises a through hole corresponding to said sensor.

13. The key assembly as claimed in claim 12, wherein the through hole is embedded with a transparent cover.

14. The key assembly as claimed in claim 10, wherein said turntable comprises a main body with an operation part being disposed on the outer edge of the main body and protruding from one side of the electronic device, and the operation part further comprises a plurality of identification marks.

15. A key assembly applicable in an electronic device, wherein the electronic device comprises a plurality of electronic components for performing a preset function, the key assembly comprising:
    a light sensor, disposed within the electronic device, for sensing an external change;
    a plurality of conducting elements, disposed within the electronic device, for triggering a signal to the electronic device; and
    a plate, linearly movably disposed within the electronic device, and having a metal blade spring disposed on one side of the plate opposite to said conducting element, wherein as the linear movement of the plate, the metal blade spring is moved together with the plate relative to the conducting elements while being physically and electrically contacted with one of said conducting elements and physically and electrically disconnected with the rest of the conducting elements, such that said light sensor is electrically connected to said corresponding conducting element; said corresponding conducting element outputs a preset signal; together with the preset signal, said light sensor outputs a triggering signal according to the external change.

16. The key assembly as claimed in claim 15, wherein said sensor is a pyroelectric IR sensor.

17. The key assembly as claimed in claim 15, wherein the electronic device further comprises a through hole corresponding to said sensor.

18. The key assembly as claimed in claim 17, wherein the through hole is embedded with a transparent cover.

19. The key assembly as claimed in claim 15, wherein said plate comprises a main body with an operation part being disposed on the outer edge of the main body and protruding from one side of the electronic device.

20. The key assembly as claimed in claim 19, wherein the electronic device has a plurality of identification marks on one side opposite to said plate.

* * * * *